Dec. 22, 1953     J D. JULIUS     2,663,283
ANIMAL HANDLING DEVICE
Filed June 14, 1952
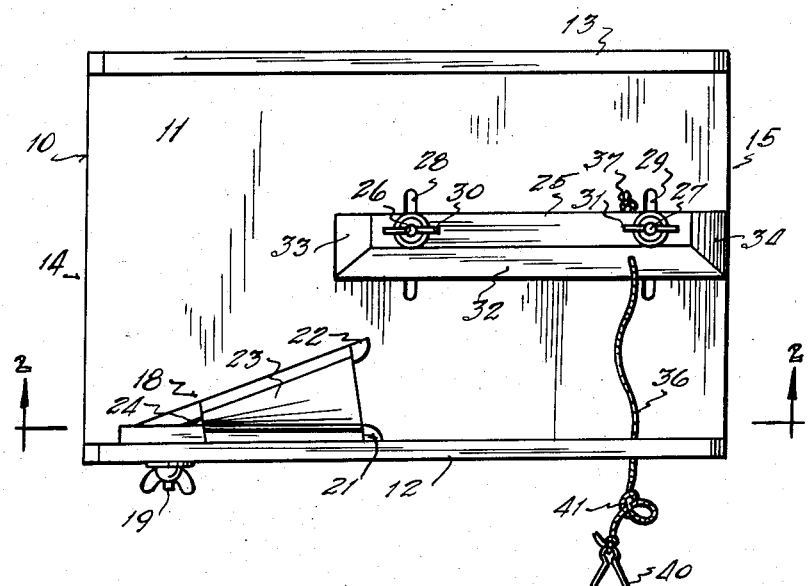
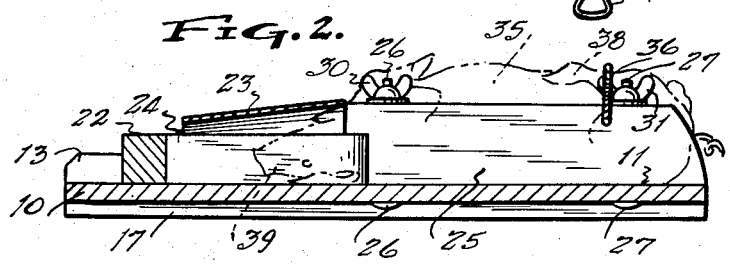
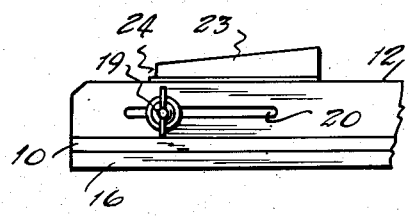
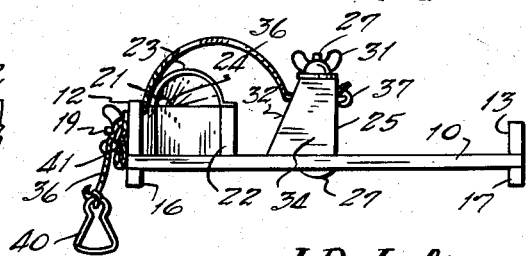
J. D. Julius
INVENTOR.
BY
ATTORNEY Patented Dec. 22, 1953

2,663,283

UNITED STATES PATENT OFFICE 2,663,283

ANIMAL HANDLING DEVICE

J D. Julius, Fort Worth, Tex.

Application June 14, 1952, Serial No. 293,614

4 Claims. (Cl. 119—103)

This invention relates to animal handling devices and it has particular reference to apparatus for holding pigs in castration operations, and its principal object resides in the provision of a table having a smooth operative surface and adjustable means thereon for holding an animal in proper position for castration.

An object of the invention is that of providing a device whereby the animal can be firmly held during the operation to insure against injury to the subject or the person performing the operation, and in a manner which will afford the least discomfort to the animal.

A further object of the invention resides in the provision of a simple and light structure which is readily portable and easily stored, affording a device of a character which will enable one person to handle an animal and perform the castration operation without aid.

Broadly, the invention contemplates the provision of a convenient and inexpensive apparatus by which castration operations can be performed economically and efficiently, and with a minimum of effort and at a great saving in time and labor.

While the foregoing objects are paramount, other and lesser objects will become manifest as the description proceeds, taken in connection with the appended drawings wherein:

Figure 1 is a plan view of the invention showing the adjustable nose securing device and the body retaining bar.

Figure 2 is a longitudinal sectional view of the table on lines 2—2 of Figure 1.

Figure 3 fragmentarily illustrates, in elevation, the adjusting screw and slot for securing the nose-holding device on an enlarged scale, and Figure 4 is a rear end view of the invention illustrating the interior of the nose holding casing and the arrangement of the body retaining elements.

The castration operation on pigs ordinarily requires careful manipulation in order to avoid serious injury to both animal and operator, and for this reason it is highly desirable to provide means for firmly securing the animal in the most convenient position for proper access to the parts to be removed. It is necessary also to secure the animal against violent resistance in order to protect the animal against accidental injury and also to minimize the possibility for injury to the person performing the operation.

Accordingly, therefore, the invention comprises a table 10 having a smooth operative surface 11 and right angular flanges 12 and 13 secured along each of its longer sides defining a working channel open at both ends 14 and 15 of the table 10, as shown in Figures 1 and 4. It is also desirable to provide supporting rails or runners 16 and 17 along and beneath the longer edges of the table 10 opposite the flanges 12 and 13 which space the table 10 from a supporting surface upon which it can be placed in use. Obviously, suitable legs can be provided for the table 10 by which it can be supported at a desirable height.

A tapered or funnel-like casing 18, conforming to the shape of a pig's nose or snout, is secured to the left flange 12 by a bolt 19 which is arranged through a slot 20 formed longitudinally of the flange 12, as shown in detail in Figure 3, whereby the casing 18 can be adjusted along the flange 12 and fixed in adjusted positions.

The casing 18 has one of its sides 21 adjacent to the inner surface of the flange 12 while its opposite side 22 angles outwardly over the surface 11 of the table 10 defining a substantial V-shape. A semi-conical hood 23 of metal is secured to the upper edges of the members 21 and and 22 to form the casing 18, the hood 23 being truncated to provide an air vent 24 thereinto.

In the approximate center of the table 10 is arranged a body retaining bar 25 which is parallel to the flanges 12 and 13 and is secured by bolts 26 and 27 to the table 10, the bolts being arranged through slots 28 and 29 formed in the table transversely of the bar 25 to provide for lateral adjustments thereof with respect to the flange 12 to which the casing 18 is attached. Wing nuts 30 and 31 are provided for the bolts 26 and 27 for convenience in making desired adjustments.

The inner surface 32 of the bar 25, and both ends 33 and 34 thereof, are inclined downwardly and outwardly. The inner surface 32 will, when so formed, more readily and comfortably conform to the body of a pig 35 supported and secured on the table 10, as shown in Figure 2.

A strong cord 36 is extended through the bar 25 and secured at one end by a knot 37 while its opposite end is passed through an aperture in the flange 12 whereby the cord 36 can be drawn tight about the rear portion of the body and hind legs 38 of the pig 35 to firmly secure the animal, in the manner shown in Figure 2, while its nose or snout 39 is extended into the casing 18, the animal's body being firmly positioned between the flange 12 and the bar 25.

A stirrup 40 is attached to the free end of the cord 36 to enable the operator to hold the same with his foot leaving both hands free with which to perform the operation. If desirable the cord 36 can be loosely knotted at 41, after it has been adjusted, to effectively hold the animal.

Manifestly, the structure herein shown and described is capable of certain changes and modifications from time to time, by persons skilled in the art, without departing from the spirit of the invention or the scope of the appended claims.

What is claimed is:

1. In a device for holding pigs in castration operations, in combination, a table having a vertical flange along each of its longer parallel edges, a semi-conical casing secured to one of said flanges and adjustable longitudinally thereof, a retention bar arranged on said table intermediate and parallel to said flanges and adjustable laterally with respect to said casing, a cord connected to said bar and slidably extending through one of said flanges whereby an animal on said table having its nose in said casing can be securely held between said retention bar and one of said flanges.

2. In a device for holding pigs in castration operations, the combination comprising a table having a flange along each of its longitudinal edges, a nose casing secured to one of said flanges and adjustable longitudinally thereof, a body retention bar secured on said table intermediate and parallel to said flanges and laterally adjustable with respect thereto and to said nose casing, and a cord attached at one end to said bar and slidable through one of said flanges for securing an animal in position for an operation on said table.

3. In a device for holding pigs for castration operations, in combination with a table having an operative surface, a flange secured along each longitudinal edge of said table, a tapered nose casing secured to one of said flanges and adjustable longitudinally thereof, a body retaining bar on said table between said flanges and parallel thereto, the said bar having means for adjusting and fixing the same at different spacings from the flange to which said nose casing is secured, and a cord secured to said bar and extended through said last named flange whereby to secure an animal on said table in position for a castration operation.

4. In a device for holding pigs for castration, in combination with a table having a smooth operative surface, a flange arranged along each of the longitudinal edges of said table, a casing secured to one of said flanges and adjustable therealong, the said casing having a semi-conical shape conformable to a pig's nose, a body retaining bar secured to said table in parallel alignment with said flanges and adjustable laterally with respect to the flange having said casing thereon, and means attached to said bar and passed through said last named flange whereby to secure a live animal on said table while its nose is embraced by said casing.

J D. JULIUS.

References Cited in the file of this patent
UNITED STATES PATENTS

| Number | Name | Date |
|---|---|---|
| 1,073,756 | Higgason | Sept. 23, 1913 |
| 1,192,845 | Bower | Aug. 1, 1916 |
| 1,209,549 | Brown et al. | Dec. 19, 1916 |
| 1,232,556 | Johnson | July 10, 1917 |
| 1,717,532 | Trees | June 18, 1929 |
| 2,184,364 | Shook | Dec. 26, 1939 |